United States Patent

Nishimura

[15] 3,666,882

[45] May 30, 1972

[54] COLOR TELEVISION PICK-UP DEVICE WITH SYNTHESIZED LUMINENCE SIGNAL

[72] Inventor: Shigeru Nishimura, Kyoto, Japan

[73] Assignee: Matsushita Electric Industrial Co., Ltd., Osaka, Japan

[22] Filed: July 25, 1969

[21] Appl. No.: 844,936

[30] Foreign Application Priority Data

July 31, 1968 Japan ....................43/54728

[52] U.S. Cl. ..........178/5.4 TC, 178/5.4 R, 178/5.4 MA

[51] Int. Cl. ..........H04n 9/06

[58] Field of Search ..........178/5.4 R, 5.4 TC, 5.4 MA, 178/5.4 M

[56] References Cited

UNITED STATES PATENTS

| | | | |
|---|---|---|---|
| 2,897,263 | 7/1959 | Mesner | 178/5.4 |
| 2,914,604 | 11/1959 | Macouski | 178/5.4 |
| 3,495,029 | 2/1970 | Underhill | 178/4 TC |
| 3,394,219 | 7/1968 | Paehr | 178/5.4 TC |

*Primary Examiner*—Robert L. Richardson
*Assistant Examiner*—Donald E. Stout
*Attorney*—Stevens, Davis, Miller & Mosher

[57] ABSTRACT

A pick-up device composed of three, "red," "green" and "-blue" pick-up tubes without using any luminance signal pick-up tube, wherein a "green" signal is employed as a luminance signal in view of the fact that the "green" signal characteristic is represented by a curve similar to a human visibility curve, and wherein the apparent horizontal resolution can be prevented from being decreased even when signals available from the three pick-up tubes are deviated from each other due to unsatisfactory registration of these signals.

4 Claims, 4 Drawing Figures

S. NISHIMURA

INVENTOR

BY Stevens, Davis, Miller & Mosher

ATTORNEYS

COLOR TELEVISION PICK-UP DEVICE WITH SYNTHESIZED LUMINENCE SIGNAL

This invention relates to a color television pick-up device.

With a four-tube type pick-up device, since a luminance signal is provided by a separate pick-up tube, it is possible to avoid a decrease in resolution by providing a high resolution for the luminance signal, even in cases where the registration of the "red", "blue" and "green" signals is unsatisfactory.

Referring to FIG. 1, there is shown an example of a four-tube type pick-up device which comprises a camera head 1, a signal processing amplifier 2 and an encoder 3. The camera head 1 comprises a color separation optical system 4 including two dichroic mirrors, three color pick-up tubes 6, 7 and 8, and amplifiers 9, 10, 11 and 12. The processing amplifier 2 includes amplifiers 13, 14, 15 and 16 for producing a chrominance signal including first and second components. The encoder 3 includes an amplifier 17 adapted to amplify the output of the luminance signal amplifier 17, delay circuit 18 for delaying the output of the amplifier 17, a matrix circuit 19 for combining the outputs of the amplifiers 14, 15 and 16, an amplifier 20 for amplifying a first component (for example, I signal) available from the matrix circuit 19, a delay circuit 21 for delaying the output of the amplifier 20, a low-pass filter 22 adapted to pass therethrough a second component (for example, Q signal) available from the matrix circuit 19, a modulator circuit 23 adapted to modulate the outputs of the filters 21 and 22, and an adder circuit 24 adapted to add the output of the modulator circuit 23 to that of the delay circuit 18. Numeral 25 represents a terminal at which an NTSC type color television signal is obtained. In the foregoing device, however, the luminance signal pick-up tube 5 is required by the camera head 1, and therefore an increased number of circuits including the amplifier to be associated with tube 5 are needed.

It is an object of the present invention to simplify such a device by eliminating the use of a luminance signal pick-up tube and yet prevent the apparent horizontal resolution from being decreased.

A further object of the present invention is to provide a simplified device of this type which is capable of achieving the foregoing object.

A still further object of the present invention is to provide the practical arrangement of the device capable of achieving the foregoing objects.

Other objects, features and advantages of the present invention will become apparent from the following description taken in conjunction with the accompanying drawings, in which.

Figure 1:
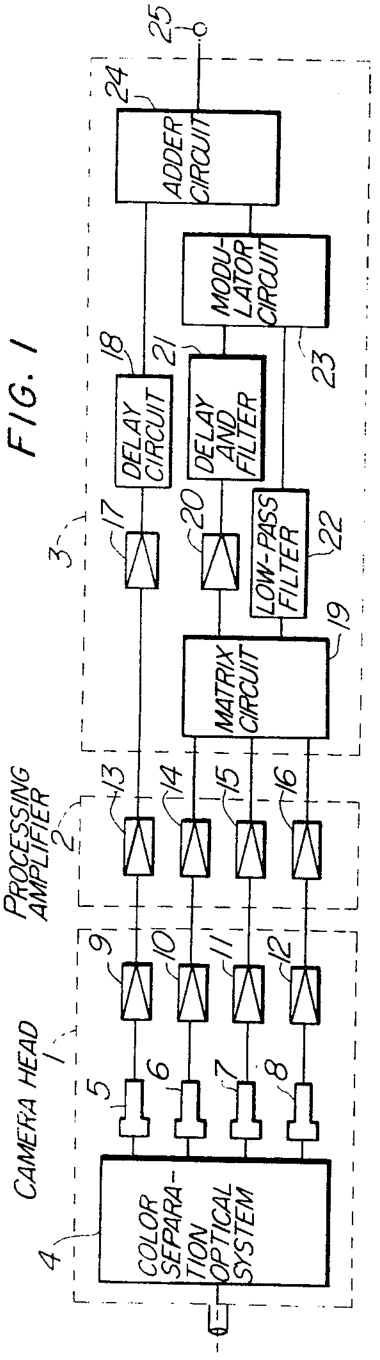
FIG. 1 is a block diagram showing a four-tube type pick-up device.

The present invention will now be described with respect to the embodiments shown in the drawings.

Figure 2:
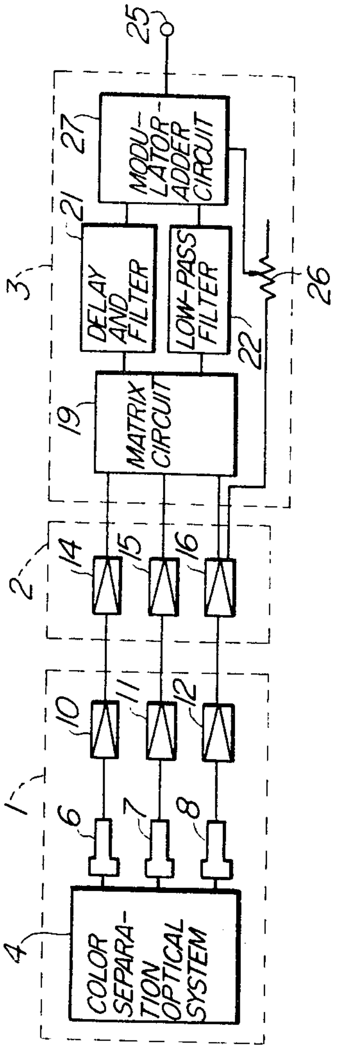
FIG. 2 is a block diagram showing the pick-up device according to an embodiment of the present invention.

Description will first be made of the embodiment shown in FIG. 2, wherein parts corresponding to FIG. 1 are shown by like reference numerals. In this device, the luminance signal pick-up tube 5 and amplifiers 9, 13, 17 and 18 of FIG. 1 device are eliminated, and the output of the "green" signal amplifier 16 is supplied as a luminance signal to a modulator-adder circuit 27 through a variable resistor 26.

Figure 3:
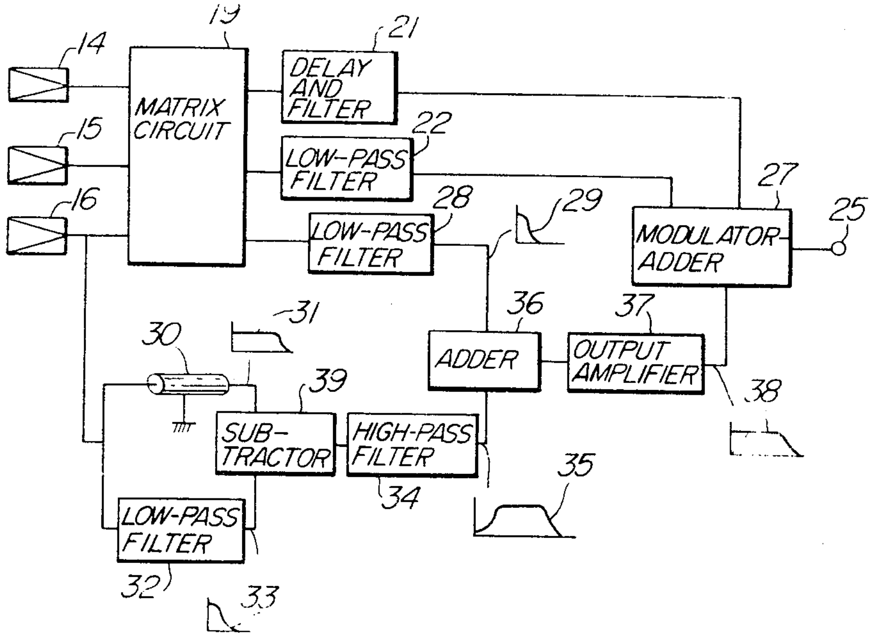
FIG. 3 is a block diagram showing the pick-up device according to a second embodiment of the present invention.
Figure 4:
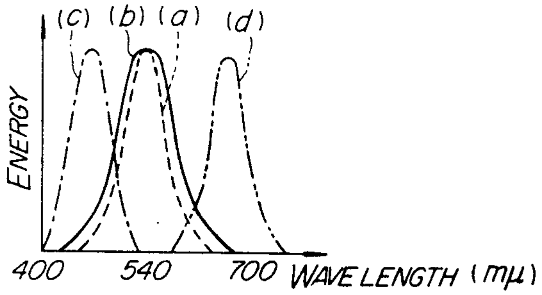
FIG. 4 is a view showing characteristics useful for explaining the pick-up device embodying the present invention.

The "green" signal represents such energy distribution as shown at (*a*) in FIG. 4, which is very close to human visibility curve (*b*) and therefore can be utilized as a luminance signal. In FIG. 4, (*c*) shows a "blue" signal energy distribution, and (*d*) shows a "red" signal energy distribution. If the "green" signal is employed in place of the luminance signal, the apparent resolution of the reproduced picture is not decreased even when the "red", "blue" and "green" color signals are inaccurately registered, but the coloration of the reproduced picture will be deteriorated from that obtained by employing the luminance signal composed of the "red", "blue" and "-green" signals theoretically. In general, however, a high resolution is required for a picture reproduced from a high-frequency component of the luminance signal but not so for a picture reproduced from a low-frequency component of the same. In view of the above, the device, as shown in FIG. 3, is improved by the provision such that a high-frequency component of the synthesized luminance signal obtained by the matrix circuit is replaced by a corresponding component of the "green" signal, whereby the reproduced picture has an ideal coloration in the low-frequency range of the luminance signal and also has a high apparent resolution in the high-frequency range of the same. A synthesized luminance signal is taken out from the matrix circuit 19, and it is made to pass through a low-pass filter 28 so as to be converted into such a signal as shown at 29. Further, a signal available from the "-green" amplifier 16 is made to pass through a delay line 30 so as to be converted to such a high frequency band "green" signal as shown at 31 which in turn is supplied to a subtractor 39 to be subtracted from a signal shown at 33 which is obtained by passing the signal available from the amplifier 16 through a low-pass filter 32. The resulting difference signal is made to pass through a high-pass filter 34 so as to be converted to such a signal as shown at 35. Subsequently, the signal 35 is supplied to an adder 36 so as to be combined with the signal 29, and then the combined signal is imparted to an output amplifier 37 from which such a signal as shown at 38 is supplied to the modulator-adder 27 together with I and Q signals. As a result, an NTSC color television signal is obtained at the terminal 25.

The luminance signal which has been synthesized in the matrix circuit 19 includes only the lower frequency band portion thereof, and therefore by combining the thus synthesized luminance signal with the higher frequency band component of the green signal, it is possible to obtain a better luminance signal than in the case where the "green" signal is utilized as luminance signal as it is.

By reproducing the resulting NTSC color television signal, a clear picture can be produced the details of which are represented only by the "green" signal. The picture thus produced represents an improved coloration because of the fact that the original luminance signal exists in the lower band portion of the NTSC color television signal mentioned above.

What is claimed is:

1. A color television pick-up device comprising three pick-up tubes, one each for producing "red", "blue" and "green" signals, respectively; means, including a matrix circuit, for converting the outputs of said three pick-up tubes into a chrominance signal including two chrominance components; means, including first filter means and first low-pass filter means, for separating low-frequency components from said chrominance signal; means for separating a high frequency component from said "green" signal; and means for mixing said low-frequency components separated from said chrominance signal with said high-frequency component of said "green" signal.

2. A color television pick-up device according to claim 1, further comprising means for separating said high-frequency component from said "green" signal; said matrix circuit including means for producing a synthesized luminance signal from said "red", "blue" and "green" signals, means for separating a low-frequency component from said synthesized luminance signal; and means for composing said low-frequency component with said high-frequency component of said "-green" signal, said composed signal being employed as a luminance signal.

3. A color television pick-up device according to claim 2, wherein said low-frequency component is separated from said synthesized luminance signal by a second low-pass filter, and said means for separating a high-frequency component from said "green" signal, comprise a circuit for delaying said "-green" signal, a third low-pass filter for separating a low-frequency component from said "green" signal, and a subtractor for subtracting said low-frequency component from said delayed "green" signal to produce said high-frequency component of said "green" signal.

4. A color television pick-up device, comprising:

three pick-up tubes for producing "red", "blue" and "green" signals, respectively;

matrix circuit means for producing, from said "red", "blue" and "green" signals, a synthesized luminance signal and a chrominance signal having two chrominance components;

means for separating a low-frequency component from said synthesized luminance signal;

means for separating a high-frequency component from said "green" signal; and means for combining said low-frequency component of said synthesized luminance signal with said high-frequency component of said "green" signal to produce a combined signal, said combined signal being employed as a luminance signal.

* * * * *